United States Patent
Gupte et al.

(10) Patent No.: US 11,741,588 B2
(45) Date of Patent: Aug. 29, 2023

(54) SYSTEMS AND METHODS FOR VISUAL ANOMALY DETECTION IN A MULTI-DISPLAY SYSTEM

(71) Applicant: Microsoft Technology Licensing, LLC, Redmond, WA (US)

(72) Inventors: Pooja Ashokbhai Gupte, Kirkland, WA (US); Deepak Saini, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 192 days.

(21) Appl. No.: 17/127,346

(22) Filed: Dec. 18, 2020

(65) Prior Publication Data
US 2022/0198640 A1    Jun. 23, 2022

(51) Int. Cl.
*H04L 12/00* (2006.01)
*G06T 7/00* (2017.01)
(Continued)

(52) U.S. Cl.
CPC .......... *G06T 7/0002* (2013.01); *G06N 20/00* (2019.01); *G08B 21/18* (2013.01); *G06F 3/1446* (2013.01);
(Continued)

(58) Field of Classification Search
CPC ..... H04L 63/1425; G06N 20/00; G06F 21/50; G06F 11/0709; G06F 3/1446;
(Continued)

(56) References Cited

U.S. PATENT DOCUMENTS 8,189,905 B2     5/2012   Eaton et al.
9,195,829 B1 *  11/2015   Goradia .................. G06F 21/55
(Continued)

FOREIGN PATENT DOCUMENTS

WO       2019222358 A1    11/2019

OTHER PUBLICATIONS

"Anomaly Detection Services", Retrieved from: https://azure.microsoft.com/mediahandler/files/resourcefiles/sa-anomaly-detection-services/SA%20Anomaly%20Detection%20Services.pdf, Retrieved Date: Sep. 18, 2020, 1 Page.
(Continued)

*Primary Examiner* — Frantz Coby
(74) *Attorney, Agent, or Firm* — Newport IP, LLC; Jacob P. Rohwer

(57) ABSTRACT

Embodiments described herein are directed to visual anomaly detection for content displayed via multi-display systems. For instance, computing devices may provide content for display by a respective display devices of a multi-display system. Each computing device provides images of the content, along with an identifier identifying the computing device as the source of the image, to a cloud-based storage system. A cloud-based visual anomaly detection system retrieves and analyzes the images from the storage system and determines whether any visual anomalies are present therein. The analysis is performed on a per-computing device basis. For instance, the system may apply a machine-learning based detection model to an image that is specific to the computing device that generated the image based on the identifier associated with the image. Upon detecting an anomaly, an automated action is performed to remediate the cause of the anomaly.

18 Claims, 7 Drawing Sheets

(51) Int. Cl.
    *G06N 20/00*     (2019.01)
    *G08B 21/18*     (2006.01)
    *G06F 3/14*     (2006.01)

(52) U.S. Cl.
    CPC ............... *G06T 2207/20081* (2013.01); *G06T 2207/30168* (2013.01)

(58) Field of Classification Search
    CPC ......... G06T 7/0002; G06T 2207/20081; G06T 2207/30168
    USPC .................................................. 709/212, 235
    See application file for complete search history.

(56) References Cited

U.S. PATENT DOCUMENTS

| | | | |
|---|---|---|---|
| 10,019,338 B1* | 7/2018 | Goradia | H04L 63/14 |
| 10,885,393 B1* | 1/2021 | Sirianni | G06K 9/6282 |
| 11,416,369 B1* | 8/2022 | Trapani | G06F 11/3419 |
| 2017/0278441 A1* | 9/2017 | Ooki | G09G 3/3648 |
| 2017/0339175 A1* | 11/2017 | Horesh | G06F 3/04842 |
| 2018/0131710 A1* | 5/2018 | Hassan | H04M 7/0084 |
| 2019/0387201 A1 | 12/2019 | Trivedi et al. | |
| 2021/0271449 A1* | 9/2021 | Vaid | G06F 7/02 |
| 2022/0198640 A1* | 6/2022 | Gupte | H04L 63/1425 |

OTHER PUBLICATIONS

"Introducing Live Video Analytics From Azure Media Services—Now In Preview", Retrieved from: http://ilikesqldata.com/introducing-live-video-analytics-from-azure-media-services-now-in-preview/, Jun. 11, 2020, 4 Pages.

Anjum, et al., "Video Stream Analysis in Clouds: An Object Detection and Classification Framework for High Performance Video Analytics", In Journal of IEEE Transactions on Cloud Computing, vol. 7, Issue 4, Oct. 1, 2019, pp. 1-14.

Fan, et al., "Tutorial: Create Automated, Schedule-Based, Recurring Workflows by Using Azure Logic Apps", Retrieved from: https://docs.microsoft.com/en-us/azure/logic-apps/tutorial-build-schedule-recurring-logic-app-workflow, Sep. 12, 2019, 26 Pages.

Odobez, et al., "Unsupervised Activity Analysis and Monitoring Algorithms for Effective Surveillance Systems", In Proceedings of the 12th European Conference on Computer Vision, Oct. 2012, 5 Pages.

Sultani, et al., "Real-world Anomaly Detection in Surveillance Videos", In Proceedings of the IEEE Conference on Computer Vision and Pattern Recognition, Jun. 2018, pp. 6479-6488.

Uddin, et al., "SIAT: A Distributed Video Analytics Framework for Intelligent Video Surveillance", In Journal of Symmetry, vol. 11, No. 7, Jul. 12, 2019, 20 Pages.

"International Search Report and Written Opinion Issued in PCT Application No. PCT/US21/060435", dated Feb. 1, 2022, 10 Pages.

\* cited by examiner

SYSTEMS AND METHODS FOR VISUAL ANOMALY DETECTION IN A MULTI-DISPLAY SYSTEM

BACKGROUND

Multi-display systems, such as video walls, have exploded in popularity. While the applications of these display systems have expanded significantly, as the technology has become more readily available, video walls are still primarily used in environments in which time-sensitive or critical data is displayed (e.g., mission control rooms, security centers, airports, subway stations, etc.). In such settings, multiple pieces of information are displayed largely, clearly, and simultaneously, thereby enabling a viewer to quickly locate and react upon changes in data. However, if such information becomes visually obfuscated, the viewer may not be properly informed of certain events. This can lead to disastrous effects. For instance, in an environment in which a video wall is utilized to monitor a network infrastructure, obfuscation of certain data may prevent an engineer from properly recognizing network threats or unexpected outages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein enable visual anomaly detection for content displayed via multi-display systems. For instance, each of a plurality of computing devices may provide content for display by a respective display device of a multi-display system. The computing device may further periodically provide images or screenshots of the content, along with a computing device identifier that identifies the computing device as the source of the image, to a cloud-based storage system. A cloud-based visual anomaly detection system periodically retrieves the images from the cloud-based storage system, analyzes the images, and determines whether any visual anomalies are present therein. The visual anomaly detection analysis is performed on a per-computing device basis. For instance, the visual anomaly detection system may apply a machine-learning based detection model to an image that is specific to the computing device that generated the image. The visual anomaly detection system utilizes the computing device identifier associated with each image to determine the detection model to apply to the image. Upon detecting an anomaly, an automated action is performed to alert a user of the detected anomaly and/or to correct the problem that causes the anomaly.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
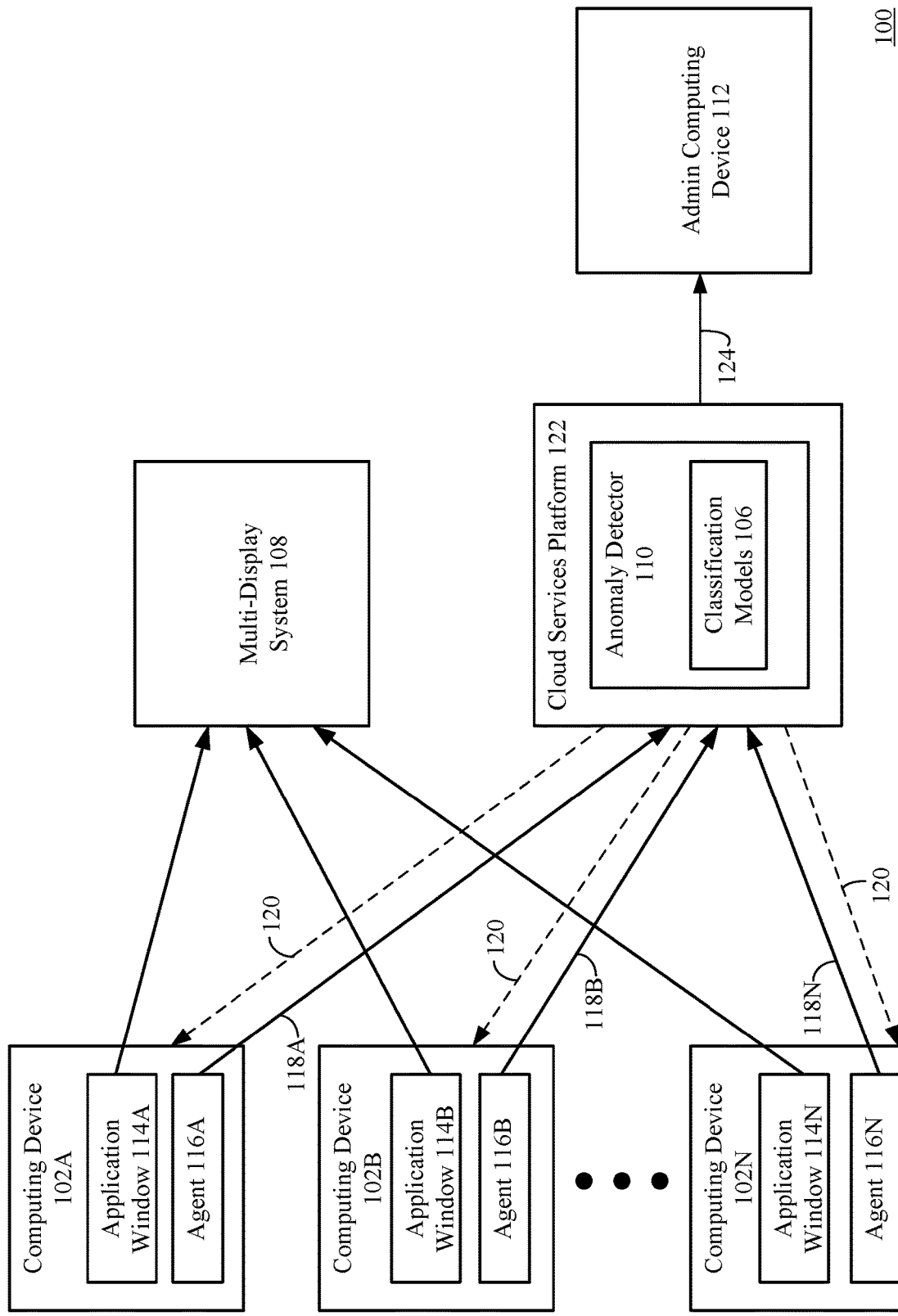
FIG. 1 shows a block diagram of a system for detecting a visual anomaly in content displayed via a multi-display system in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The embodiments described herein are directed to visual anomaly detection for content displayed via multi-display systems. For instance, each of a plurality of computing devices may provide content for display by a respective display device of a multi-display system. The computing device may further periodically provide images or screenshots of the content, along with a computing device identifier that identifies the computing device as the source of the image, to a cloud-based storage system. A cloud-based visual anomaly detection system periodically retrieves the images from the cloud-based storage system, analyzes the images, and determines whether any visual anomalies are present therein. The visual anomaly detection analysis is performed on a per-computing device basis. For instance, the visual anomaly detection system may apply a machine-learning based detection model to an image that is specific to the computing device that generated the image. The visual anomaly detection system utilizes the computing device identifier associated with each image to determine the detection model to apply to the image. Upon detecting an anomaly, an automated action is performed to alert a user of the detected anomaly and/or to correct the problem that causes the anomaly.

The techniques described herein enable the real-time detection of visual anomalies. For instance, the period at which the computing devices provide images to the storage system and the period at which the visual anomaly detection system retrieves images from the storage system may be configured at a relatively high frequency (e.g., every second). This synchronization enables the anomaly detection analysis to be performed constantly and continuously. Thus, not only is the time to detect such anomalies greatly reduced, but also the time to mitigate such anomalies.

Moreover, the techniques described herein enable the anomaly detection for a particular computing device to be offloaded to the cloud-based visual anomaly detection system, thereby conserving various compute resources (e.g., processing cycles, memory, input/output (I/O) transactions, power, etc.) of the computing device. Additionally, because the cloud-based visual anomaly detection system is aware of which computing device generated a particular image and applies a detection model specific to the computing device via the computing device identifiers, the anomaly detection accuracy performed on images from a particular computing device is improved (i.e., there are fewer false positives and fewer false negatives).

FIG. 1 shows a block diagram of a system 100 for detecting a visual anomaly in content displayed via a multi-display system in accordance with an example embodiment. As shown in FIG. 1, system 100 includes one or more computing device 102A-102N, a multi-display system 108, a cloud services platform 122, and an admin computing device 112. Each of computing device(s) 102A-102N, multi-display system 108, cloud services platform 122, and/or admin computing device 112 may be communicatively coupled via a network, which may comprise one or more networks such as local area networks (LANs), wide area networks (WANs), enterprise networks, the Internet, etc., and may include one or more of wired and/or wireless portions. Computing device(s) 102A-102N and admin computing device 112 are computing devices via which a user is enabled to run applications, visit web pages compatible with various web browsers, etc. Computing device(s) 102A-102N and admin computing device 112 may be any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), etc.

In accordance with at least one embodiment, cloud services platform 122 comprises part of the Microsoft® Azure® cloud computing platform, owned by Microsoft Corporation of Redmond, Wash., although this is only an example and not intended to be limiting. Cloud services platform 122 may include one or more of any commercially available cloud computing platform and/or any other network-based server and storage system. As shown in FIG. 1, cloud services platform 122 comprises an anomaly detector 110, which is described below, and various resources. Examples of resource(s) 110 include a user or storage account, a virtual machine, a database, a cloud-based subscription, etc. Cloud services platform 122 may comprise a group or collection of one or more servers or nodes (e.g., computing devices) that are each hosted on a network such as the Internet (e.g., in a "cloud-based" embodiment) to store, manage, and process data. In an embodiment, the nodes may be co-located (e.g., housed in one or more nearby buildings with associated components such as backup power supplies, redundant data communications, environmental controls, etc.) to form a datacenter, or may be arranged in other manners. Cloud services platform 102 may comprise any number of datacenters of nodes that are located in various geographical regions.

Multi-display system 108 may comprise a plurality of display devices tiled together contiguously or overlapped to form one large screen. An example of multi-display system 108 include, but are not limited to, a video wall. Examples of display devices include, but are not limited to, monitors, video projectors, television sets, etc.

The contents generated by a corresponding computing device of computing device 102A-102N may be displayed on a respective display of multi-display system 108. For example, each of computing device(s) 102A-102N may execute an application that renders a respective application window (e.g., application windows 114A-114N) on a display device coupled to the computing device. Each of application windows 114A-114N may be displayed by an application executing on its associated computing device of computing device(s) 102A-102N. Each of application windows 114A-114N may include the content item. A user of a particular computing device of computing device(s) 102A-102N may maximize an application window so that other content generated by the computing device is not displayed via the display device of multi-display system 108 to which the computing device is connected. Examples of content items, include, but are not limited to, images, photos, videos, web pages, documents, and/or any content that may be included in each of application windows 114A-114N.

In accordance with an embodiment, each of application windows 114A-114N is a browser window provided by a browser application executing on its associated computing device of computing device(s) 102A-102N. The browser application is a software application configured for accessing information on the World Wide Web. For instance, the browser application may be configured to traverse to a web page and render the contents of the web page via the application window. In accordance with such an embodiment, the content item displayed by a corresponding display device of multi-display system 108 is the contents (i.e., the web page) of the browser window (i.e., application windows 114A-114N). Examples of a browser application include, but are not limited to, Internet Explorer® or Microsoft Edge®, both developed by Microsoft Corp., Mozilla Firefox®, developed by Mozilla Corp. of Mountain View, Calif., Safari®, developed by Apple Inc. of Cupertino, Calif., and Google® Chrome™ developed by Google Inc. of Mountain View, Calif.

Figure 2:
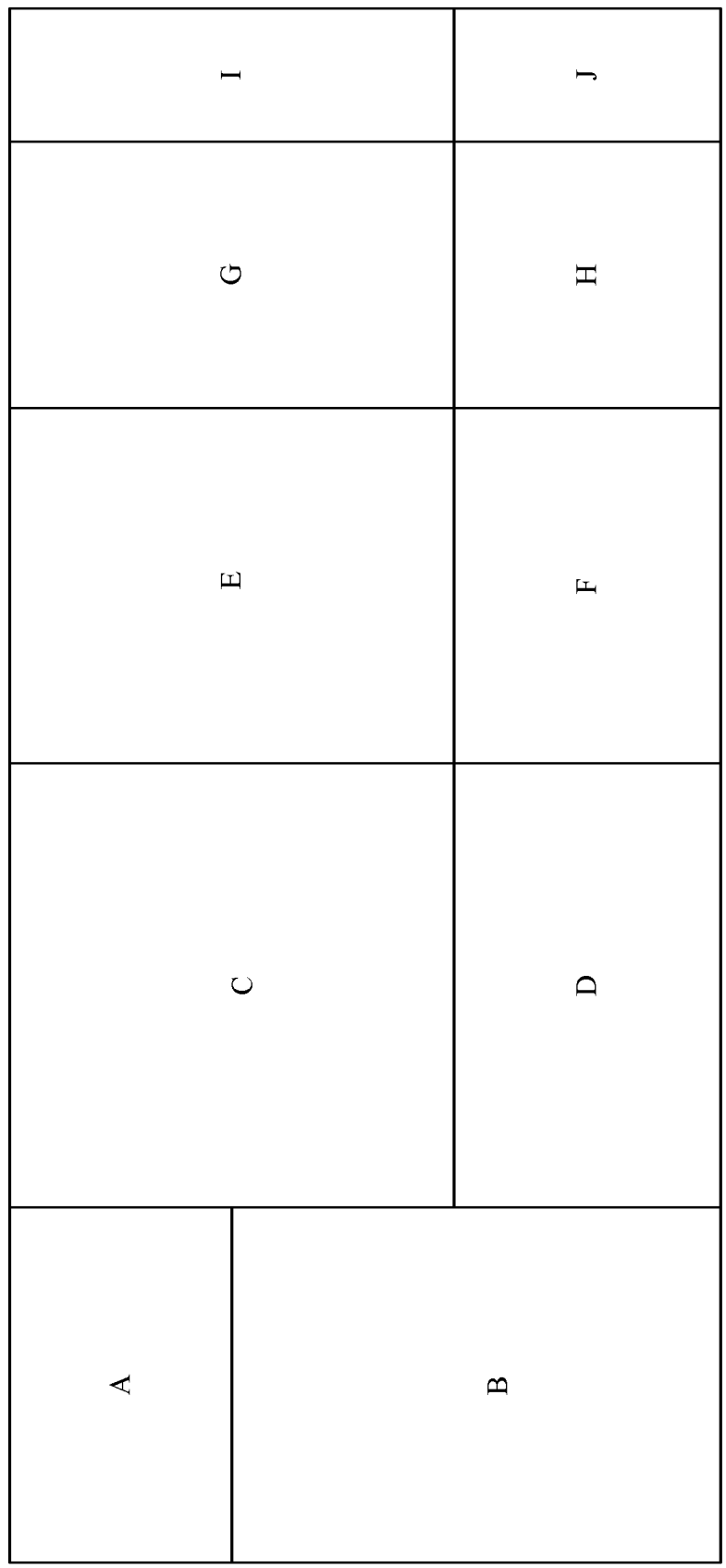
FIG. 2 depicts a block diagram of a multi-display system in accordance with an example embodiment.

FIG. 2 depicts a block diagram of a multi-display system 200 in accordance with an example embodiment. Multi-display system 200 is an example of multi-display system 108, as described above with reference to FIG. 1. As shown in FIG. 2, multi-display system 200 comprises ten display devices 202A-202J that are tiled together contiguously. In FIG. 2, a front view is shown in which the display screens of display devices 202A-202J are shown. A narrow bezel may surround each of the display screens in order to minimize the gap between the display screens. Each of computing devices 102A-102N may be communicatively coupled to respective display device of display devices 202A-202J via an High Definition Multimedia Interface (HDMI) interface, a DisplayPort interface, or any interface suitable for transmitting video and/or audio signals.

As described above, each of display devices 202A-202J may display a content item generated by one of computing device(s) 102A-102N, as shown in FIG. 1. For example, display device 202A may display a content item generated by computing device 102A, display device 202B may display a content item generated by computing device 102B, display device 202C may display a content item generated by computing device 102C, display device 202D may display a content item generated by computing device 102D, display device 202E may display a content item generated by computing device 102E, display device 202F may display a content item generated by computing device 102F, display device 202G may display a content item generated by computing device 102G, display device 202H may display a content item generated by computing device 102H, display device 202I may display a content item generated by computing device 102I, and display device 202J may display a content item generated by computing device 102J. It is noted that a content item from a particular computing device of computing devices 102A-102N may be provided to more than one of display devices 202A-202J. Thus, one or more of computing devices 102A-102N may be communicatively coupled to more than one display device of display devices 202A-202J. For example, a content item may be provided from computing device 102A and displayed on display devices 202A and 202B. In another example, a content item may be provided from computing device 102B and displayed on display devices 202C, 202D, and 202E.

Multi-display system 200 may be utilized in various settings, such as, but not limited to, control rooms, stadiums, convention centers, airports, or any large private and/or public venue. Multi-display system 200 may be utilized for a variety of different applications, including, but not limited to, systems monitoring (e.g., network monitoring, cloud platform monitoring, real-time production monitoring), displaying flight data (e.g., flight paths, departure times, arrival times, etc.), big data visualization and exploration, etc.

In certain situations, one or more of display devices 202A-202J may display content that was not expected to be displayed. Such content may be referred to as a visual anomaly. For instance, the computing device of computing device(s) 102A-102N may cause the wrong content to be displayed. For example, an application window (e.g., application window 114A) in which the content item is displayed may be minimized. In another example, application window 114 may be obstructed. For instance, a menu of an operating system (e.g., a start menu) executing on the computing device, a window of the operating system (e.g., a command prompt), or another application window may be positioned (partially or fully) over application window 114. In yet another example, application window 114 may provide the wrong content item to a particular display screen of display screens 202A-202J. For instance, display device 202A may be normally utilized to display a map provided via application window 114A of computing device 102A. However, instead, application window 114A displays arrival times, which were, for example, supposed to be displayed on a different display device of display devices 202A-202J.

Referring again to FIG. 1, anomaly detector 110 is configured to detect such anomalies. For instance, anomaly detector 110 may analyze images representative of the contents being displayed by each of computing device(s) 102A-102N. For example, as shown in FIG. 1, each of computing device(s) 102A-102N may comprise a respective agent (e.g., agents 116A-116N). Agent 116A may be configured to periodically generate an image or screenshot of the contents generated by computing device 102A, agent 116B may be configured to periodically generate an image or screenshot of the contents generated by computing device 102B, and agent 116N may be configured to periodically generate an image or screenshot of the contents generated by computing device 102N. In accordance with an embodiment, each of agents 116A-116N may be an executable file executing on its respective computing device.

Each of agents 116A-116N may generate the image and provide the image to cloud services platform 122 in accordance with a predetermined frequency (e.g., once every 1 minute, 5 minutes, etc.). In accordance with an embodiment, the frequency at which the image is generated may be user-configurable. Agent 116A may provide images (shown as image 118A) to a storage system (not shown) communicatively coupled to anomaly detector 110, e.g., via the network by which its computing device 102A and cloud services platform 122 are coupled. Agent 116B may provide images (shown as image 118B) to the storage system communicatively coupled to anomaly detector 110, e.g., via the network by which its computing device 102B and cloud services platform 122 are coupled. Agent 116N may provide images (shown as image 118N) to the storage system communicatively coupled to anomaly detector 110, e.g., via the network by which its computing device 102N and cloud services platform 122 are coupled.

Each of agents 116A-116N may also provide a computing device identifier with the image provided to the storage system communicatively coupled to anomaly detector 110. The computer device identifier identifies the computing device that generated the associated image. For example, agent 116A provides a computing device identifier that identifies computing device 102A as the source of image 118A. Agent 116B provides a computing device identifier that identifies computing device 102B as the source of image 118B. Agent 116N provides a computing device identifier that identifies computing device 102N as the source of image 118N. Each computing device identifier may also specify a position that the corresponding content item provided via the associated computing device's application window is displayed with respect to multi-display system 108. For example, if computing device 102A is designated to display content items on display device 202A of multi-display system 200, then the computing device identifier provided by agent 116A may indicate as much. As an example, the computing device identifier may be specified as follows ("PC1" or "Position 1"), which specifies that the content item corresponding to image 118A originated from computing device 102A and is displayed on display device 202A. In another example, if computing device 102B is designated to display content items on display device 202B of multi-display system 200, then the computing device identifier provided by agent 116B may indicate as much. As an example, the computing device identifier may be specified as follows ("PC2" or "Position 2"), which specifies that the content item corresponding to image 118B originated from computing device 102B and is displayed on display device 202B.

Anomaly detector 110 retrieves images 118A-118N from the storage system and analyzes images 118A-118N to determine whether anomalies are present therein. Anomaly detector 110 may perform the analysis on a per-computing device basis, as a visual anomaly on one computing device may not be considered a visual anomaly on another computing device. For instance, suppose application window 114A of computing device 102A is configured to display a map on display device 202A and application window 114B of computing device 102B is configured to display arrival times on display device 202B. Further suppose that instead of displaying the map, application window 114A of computing device 102A displays arrival times. In this case, while there is nothing visually odd about the arrival times displayed via display device 202A, the content is still considered to be a visual anomaly as the wrong content is being displayed.

Anomaly detector 110 may utilize machine-learning based techniques to determine whether a visual anomaly is present in any of images 118A-118N received by anomaly detector 110. For instance, anomaly detector 110 may comprise a plurality of classification models 106. Each of classification models 106 is configured to generate a score for images 118A-118N received from a particular computing device of computing device(s) 102A-102N. Anomaly detector 110 utilizes the computing device identifier received with an image to determine which classification model of classification models 106 is to be utilized for anomaly detection.

The generated score indicates a likelihood that an image processed thereby comprises a visual anomaly in accordance with the computing device identifier received for that image. For instance, a first classification model of classification models 106 analyzes images 118A from computing device 102A to detect visual artifacts that are atypical for that computing device. A second classification model of classification models 106 analyzes images 118B from computing device 102B to detect visual artifacts that are atypical for that computing device. The score may comprise a value between 0.0 and 1.0, where higher the number, the greater the likelihood that an image comprises a visual anomaly.

Techniques for generating classification models 106 are described below with reference to FIGS. 5 and 6.

Anomaly detector 110 may determine that an anomaly is present in an image if the score has a predetermined relationship with a predetermined threshold. For example, anomaly detector 110 may compare the score with a predetermined threshold to determine whether or not the value exceeds the predetermined threshold (e.g., a score of 0.85). Responsive to determining that the score exceeds the predetermined threshold, anomaly detector 110 determines that the image has a visual anomaly. Responsive to determining that the score does not exceed the predetermined threshold, anomaly detector 110 determines that the image does not have a visual anomaly. It is noted that the score values described herein are purely exemplary and that other score values may be utilized. It is further noted that the score values may have a different type of predetermined relationship with the predetermined threshold (including, but not limited to, whether the score is greater than, less than, greater than or equal to, less than or equal to, or equal to the predetermined threshold).

In accordance with an embodiment, anomaly detector 110 may be configured to generate a plurality of scores, where each score is indicative of a particular type of visual anomaly. The type of visual anomaly having the highest score (and/or having the predetermined relationship with the predetermined threshold) may be selected as the visual anomaly.

In response to determining that a visual anomaly exists, anomaly detector 110 may perform one or more automated actions that cause the visual anomaly to be removed. The action performed may depend on the determined type of visual anomaly detected. One example of an action includes, but is not limited to, providing an alert 124 to a computing device of an administrator (e.g., admin computing device 112) indicating that the visual anomaly has been detected in an image, along with specifying the identifier associated with the image. This way, the administrator can quickly identify the computing device displaying the visual anomaly and debug the issue causing the visual anomaly. Examples of notification 124 include a short messaging service (SMS) message, a telephone call, an e-mail, a notification that is presented via an incident management service, etc. Another example of an action includes causing a computing device that provided the image (e.g., one of computing device(s) 102A-102N) to be automatically restarted. For example, anomaly detector 110 may provide a command (shown as command 120), to the computing device of computing device(s) 102A-102N displaying the content with the visual anomaly, that automatically causes the computing device to be restarted. A further example of an action includes causing an application window comprising the visual anomaly to be minimized. For instance, if another application window is positioned over the application window (i.e., application window 114A) that includes content intended to be displayed via multi-display system 108, anomaly detector 110 may provide a command (shown as command 120) to the computing device (i.e., computing device 102A) displaying that application window. The command causes the problematic window to be minimized.

Figure 3:
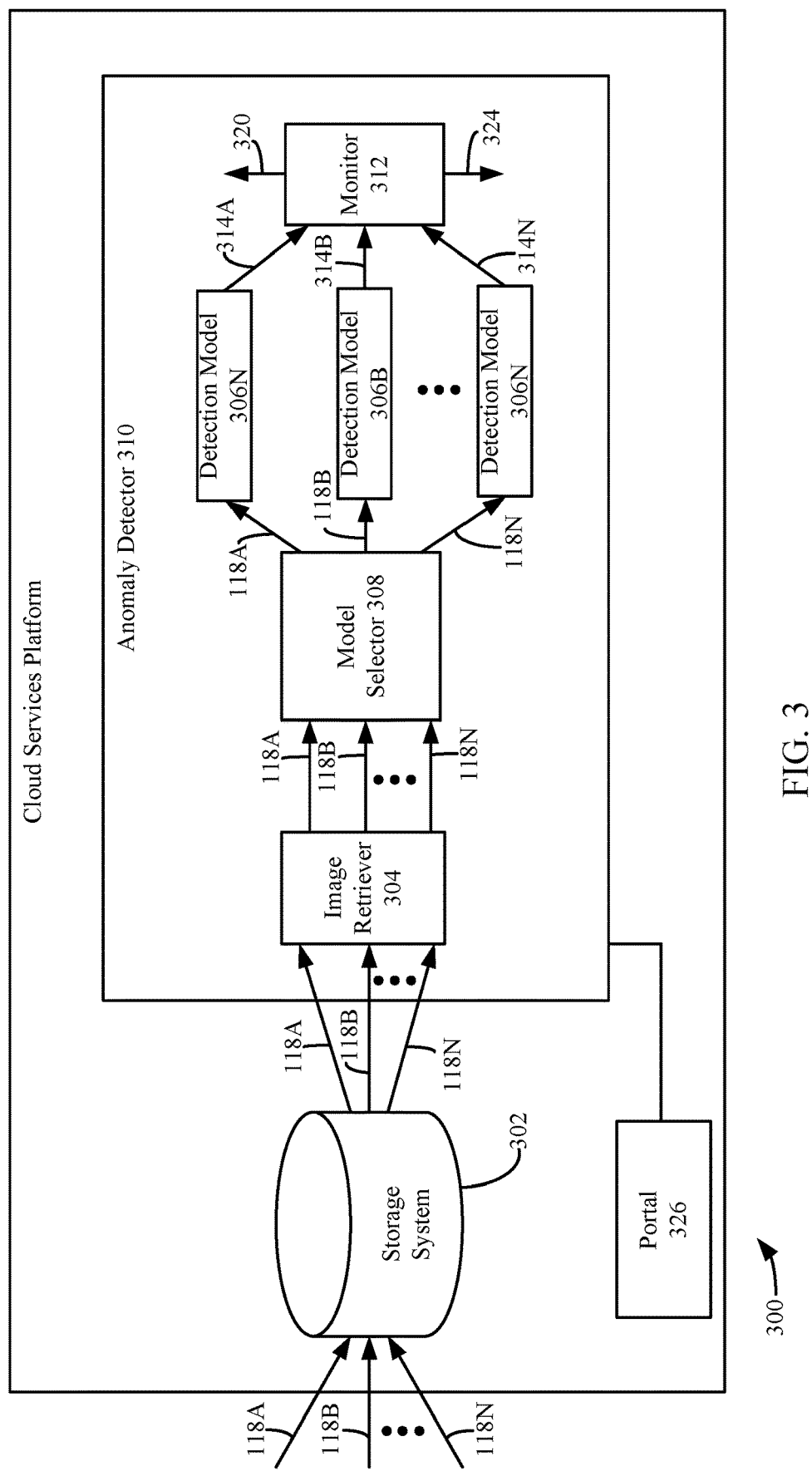
FIG. 3 depicts a block diagram of a cloud services platform in which an anomaly detection system is implemented in accordance with an example embodiment.

FIG. 3 depicts a block diagram of a cloud services platform 300 in which an anomaly detection system is implemented in accordance with an example embodiment. As shown in FIG. 3, cloud services platform 300 comprises a storage system 302 and an anomaly detector 310. Anomaly detector 310 is an example of anomaly detector 110, as described above with reference to FIG. 1. Anomaly detector 310 comprises an image retriever 304, a model selector 308, a plurality of visual anomaly detection models 306A-306N, a monitor 312, and a portal 326. Detection models 306A-306N are examples of detection models 106, as described above with reference to FIG. 1.

Storage system 302 is configured to store images 118A-118N received from a plurality of different computing devices (e.g., computing devices 102A-102N, as described above with reference to FIG. 1.). Storage system 302 further stores a respective computing device identifier associated with each of images 118A-118N. Storage system 302 may be associated with a storage account for a user of cloud services platform 300. For instance, a user may obtain a cloud-based subscription to utilize various resources of cloud services platform 300. One such resource may be storage system 302 and/or anomaly detector 310. Storage system 302 may comprise any type and/or number of physical memories and/or storage devices that are described herein, and/or as would be understood by a person of skill in the relevant art(s) having the benefit of this disclosure.

Image retriever 304 may be configured to periodically retrieve images 118A-118N and their associated computing device identifiers from storage system 302. For example, image retriever 304 may retrieve images 118A-118N in accordance with a predetermined frequency (e.g., every 1 minute, 5 minutes, etc.). Image retriever 304 provides the retrieved images 118A-118N and their associated computing device identifiers to model selector 308. In accordance with an embodiment, the frequency at which images 118A-118N and their associated computing device identifiers are retrieved may be user-configurable. The frequency at which image retriever 304 retrieves images 118A-118N may be the same frequency at which agent 116A-116N (as described above with reference to FIG. 1) provide images 118A-118N to storage system 302. Synchronizing the frequencies for providing images 118A-118N to storage system 302 and retrieving images 118A-118N from storage system 302 to the same, relatively low value (e.g., 1 second, 10 seconds, 30 seconds, 1 minute, etc.) advantageously enables the real-time detection of anomalies, as the anomaly detection is performed constantly and continuously.

Model selector 308 is configured to determine which of detection models 306A-306N is to perform anomaly detection for a particular image of images 118A-118N based on the computing device identifier associated therewith. As described above, anomaly detector 310 performs anomaly detection on a per-computing device basis, as a visual anomaly on one computing device may not be considered a visual anomaly on another computing device. In accordance with an embodiment, a computing device-specific detection model is generated for each of computing devices from which images 118A-118N are received (i.e., computing device(s) 102A-102N). For instance, detection model 306A is generated for computing device 102A, detection model 306B is generated for computing device 102B, detection model 306N is generated for computing device 102N, and so on and so forth.

When receiving an image, model selector 308 identifies the computing device at which the image was generated based on the image's associated computing device identifier. After determining the computing device, model selector 308 provides the image to the detection model associated with the computing device. For example, suppose image 118A is associated with a computing device identifier that specifies that image 118A was generated from computing device 102A. In this example, model selector 308 provides image 118A to detection model 306A for visual anomaly analysis.

In another example, suppose image 118B is associated with a computing device identifier that specifies that image 118B was generated from computing device 102B. In this example, model selector 308 provides image 118B to detection model 306B for visual anomaly analysis. In a further example, suppose image 118N is associated with a computing device identifier that specifies that image 118N was generated from computing device 102N. In this example, model selector 308 provides image 118N to detection model 306N for visual anomaly analysis.

Each of detection models 306A-306N is configured to output a respective score indicative of a likelihood that an image processed thereby comprises a visual anomaly. For example, detection model 106A outputs a score 314A indicative of a likelihood that image 118A comprises a particular visual anomaly, detection model 306B outputs a score 314B indicative of a likelihood that image 118B comprises a particular visual anomaly, and detection model 306N outputs a score 314N indicative of a likelihood that image 118N comprises a particular visual anomaly. Scores 314A-314N are provided to monitor 312.

Monitor 312 is configured to determine that an anomaly is present in any of images 118A-118N if the score generated for a particular image of images 118A-118N has a predetermined relationship with a predetermined threshold. For example, monitor 312 may compare each of scores 314A-314N with a predetermined threshold to determine whether or not the value exceeds the predetermined threshold (e.g., a score of 0.85). Responsive to determining that any of scores 314A-314N exceeds the predetermined threshold, monitor 312 determines that the image(s) associated with score(s) exceeding the predetermined threshold have a visual anomaly. Responsive to determining that none of scores 314A-314N exceed the predetermined threshold, monitor 312 determines that none of images 118A-118N has a visual anomaly.

In accordance with an embodiment, each of detection models 306A-306N may be configured to generate a plurality of scores, where each score is indicative of a particular type of visual anomaly. The type of visual anomaly having the highest score (and/or having the predetermined relationship with the predetermined threshold) for a particular image may be selected as the detected visual anomaly for that image.

In response to determining that a visual anomaly exists, monitor 312 may perform one or more automated actions that cause the visual anomaly to be removed. The action performed may depend on the determined type of visual anomaly detected. One example of an action includes, but is not limited to, providing an alert 324 to a computing device of an administrator (e.g., admin computing device 112, as shown in FIG. 1) indicating that the visual anomaly has been detected in an image, along with specifying the computing device identifier associated with the image. This way, the administrator can quickly identify the computing device displaying the visual anomaly and debug the issue causing the visual anomaly. Command 324 is an example of command 124, as described above with reference to FIG. 1. Another example of an action includes causing a computing device that provided the image (e.g., one of computing device(s) 102A-102N) to be automatically restarted. For example, monitor 312 may provide a command (shown as command 320), to the computing device displaying the content with the visual anomaly, that automatically causes the computing device to be restarted. A further example of an action includes causing an application window comprising the visual anomaly to be minimized. For instance, if another application window is positioned over the application window that includes the content intended to be displayed by the multi-display system (e.g., multi-display system 108, as shown in FIG. 1), monitor 312 may provide a command (shown as command 320) to the computing device displaying that application window. The command causes the problematic window to be minimized. Command 320 is an example of command 120, as described above with reference to FIG. 1.

It is noted that each of storage system 302 and/or certain components of anomaly detector 310 (i.e., image receiver 304, model selector 308, detection models 306A-306N, and/or monitor 312 may be maintained and/or executing on the same server (or node) alternatively, on a different node of cloud services platform 300.

Image retriever 304 and/or model selector 308 may be implemented by an event-triggered serverless cloud-based compute service, such as, but not limited to Azure® Functions™ published by Microsoft Corp. An example of monitor 312 includes, but is not limited to, Azure® Monitor published by Microsoft Corp. Alert 312 may be provided to a user utilizing an incident management system, including, but not limited to, Azure® Incident Management System, published by Microsoft Corp.

Anomaly detector 310 may be provided as a service offered via cloud services platform 300. A user or customer may utilize cloud services platform 300 by first establishing an account and/or cloud-based subscription with cloud services platform 300. A user may configure his or her account or subscription to utilize anomaly detector 310. For instance, a user may be given access to his or her account or subscription by logging into portal 326. Upon logging into portal 326, a user may select services, such as anomaly detector 310, to be utilized. A user may also be enabled to configure various aspects of the selected services, including anomaly detector 310.

A user may access portal 326 via a computing device (e.g., computing devices 102A-102N or admin computing device 112, as shown in FIG. 1). For instance, a user may access portal 326 by interacting with an application installed on a computing device capable of accessing portal 326. For example, the user may use a browser application installed on such a computing device to traverse a network address (e.g., a uniform resource locator) to portal 326, which invokes a user interface (e.g., a web page) in a browser window rendered on such a computing device. By interacting with the user interface, the user may utilize portal 326 to select services and/or configure services, such as anomaly detector 310.

For instance, a user may utilize portal 326 to register each of computing device 102A-102N that are used to send content to multi-display system 108 and provide images 118A-118C to storage system 302. This way, anomaly detector 310 is made aware of how many computing devices are providing content and images. Utilizing such information, anomaly detector 310 may allocate the required cloud-based compute resources (e.g., processors, memory, storage devices, etc.) to implement visual anomaly detection (e.g., the more computing devices that provide content and images, the more resources that are allocated to account for the additional detection models required).

Portal 326 may also be utilized to configure anomaly detector 326 to operate in different modes. For instance, a first mode may be a training mode in which anomaly detector 326 utilizes previously-collected images to train a supervised machine learning algorithm for generation of visual anomaly detection models 306A-306N. Additional details about training a supervised machine learning algorithm is described below with reference to FIGS. 5 and 6. A second mode may be a real-time detection mode in which anomaly detector 310 detects visual anomalies in images 118A-118C as described above.

A user may be further enabled to configure the frequency at which image retriever 304 retrieves images 118A-118N from storage system 302. For instance, in an embodiment in which image retriever 304 is implemented via an event-triggered serverless cloud-based compute service, image retriever 304 may be configured (e.g., via portal 326) to utilize one or more triggers and/or bindings to define when image retriever 304 is to be invoked and what data is accessed responsive to the triggers. In one example, the trigger may be an event received from a periodic timer. Each time the periodic timer expires, an event is generated that causes (or triggers) image retriever 304 to retrieve images 118A-118C from storage system 302. Portal 326 may be utilized to define such a trigger, to define that image retriever 304 is to retrieve data from storage system 302, and configure the period at which the periodic timer expires.

Figure 4:
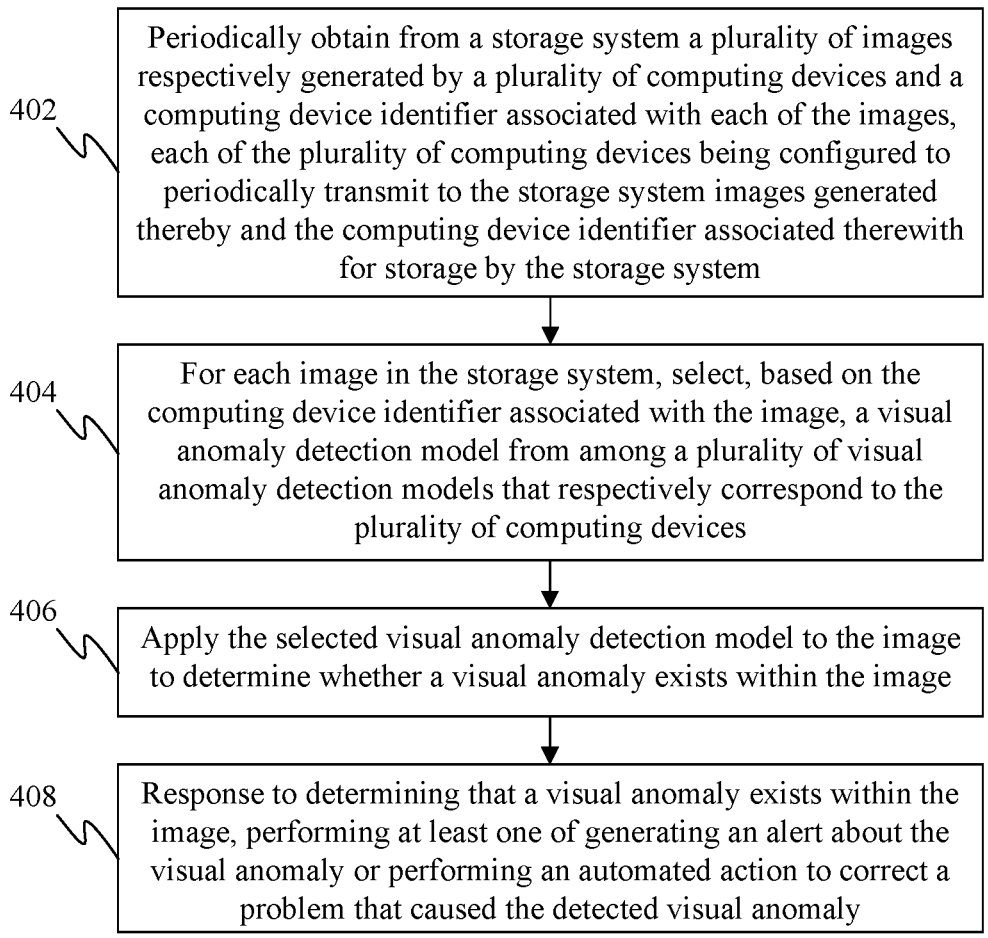
FIG. 4 shows a flowchart of a method for detecting a visual anomaly in an image in accordance with an example embodiment.

Accordingly, a visual anomaly may be detected in an image in many ways. For example, FIG. 4 shows a flowchart 400 of a method for detecting a visual anomaly in an image in accordance with an example embodiment. In an embodiment, flowchart 400 may be implemented by anomaly detector and 110 of FIG. 1 and anomaly detector 310 of FIG. 3. Accordingly, for purposes of illustration, flowchart 400 is described with continued reference to FIGS. 1 and 3. Other structural and operational embodiments will be apparent to persons skilled in the relevant art(s) based on the following discussion.

Flowchart 400 of FIG. 4 begins with step 402. In step 402, a plurality of images and a computing device identifier associated with each of the plurality of images are periodically obtained from a storage system. The plurality of images is respectively generated by a plurality of computing devices. Each of the plurality of computing devices are configured to periodically transmit to the storage system images generated thereby and the computing device identifier associated therewith for storage by the storage system. For example, with reference to FIG. 3, image retriever 304 of anomaly detector 310 periodically obtains from storage system 302 images 118A-118N and a computing device identifier associated with each of images 118A-118N. Image retriever 304 provides images 118A-118N and the associated computing device identifiers to model selector 308. Each of images 118A-118N are generated by a respective computing device of computing devices 102A-102N. For example, computing device 102A generates image 118A, computing device 102B generates image 118B, and computing device 102N generates image 118N. Computing devices 102A-102N are configured to periodically transmit images 118A-118N and their associated computing device identifiers to storage system 302. For example, agent 116A of computing device 102A periodically generates images thereby and transmits the images to storage system 302, agent 116B of computing device 102B periodically generates images thereby and transmits the images to storage system 302, and agent 116N of computing device 102N periodically generates images thereby and transmits the images to storage system 302.

In accordance with one or more embodiments, a frequency at which each of the computing devices is configured to periodically transmit the images generated thereby is related to a frequency at which the plurality of images are periodically obtained from the storage. For example, with reference to FIGS. 1 and 3, a frequency at which each of computing devices 102A-102N is configured to periodically transmit images 118A-118N generated thereby is related to (e.g., is the same as) a frequency at which images 118A-118N are periodically obtained from storage system 302.

In accordance with one or more embodiments, the frequency at which each of the computing devices is configured to periodically transmit the images generated thereby and the frequency at which the plurality of images are periodically obtained from the storage system are user-configurable. For example, with reference to FIGS. 1 and 3, the frequency at which each of computing devices 102A-102N is configured to periodically transmit images 118A-118N generated thereby and the frequency at which images 118A-118N are periodically obtained from storage system 302 are user-configurable In accordance with one or more embodiments, the plurality of images corresponds to content provided to a multi-display system by the plurality of computing devices. For example, with reference to FIG. 1, computing device 102A provides content corresponding to image 118A to multi-display system 108 for display by a first display device thereof, computing device 102B provides content corresponding to image 118B to multi-display system 108 for display by a second display device thereof, and computing device 102N provides content corresponding to image 118N to multi-display system 108 for display by a third display device thereof.

In accordance with one or more embodiments, the computing device identifier associated with a particular image of the plurality of images identifies a particular computing device of the plurality of computing devices that generated the particular image. For example, with reference to FIG. 1, the computing device identifier associated with image 118A identifies computing device 102A as generating image 118A, the computing device identifier associated with image 118B identifies computing device 102B as generating image 118B, and the computing device identifier associated with image 118N identifies computing device 102N as generating image 118N.

At step 404, for each image obtained from the storage system, a visual anomaly detection model is selected from among a plurality of visual anomaly detection models based on the computing device identifier associated with the image. The plurality of visual anomaly detection models respectively corresponds to the plurality of computing devices. For example, with reference to FIG. 3, for each of images 118A-118N obtained from storage system 302, model selector 308 of anomaly detector 310 selects a detection model from detection models 306A-306N based on the computing device identifier associated with the image. Detection model 306A is associated with computing device 102A, detection model 306B is associated with computing device 102B, and detection model 306N is associated with computing device 102N.

At step 406, for each image, the selected visual anomaly detection model for that image is applied to the image to determine whether a visual anomaly exists within the image. For example, with reference to FIG. 3, detection model 306A is applied to image 118A, detection model 306B is applied to image 118B, and detection model 306N is applied to image 118N. Detection model 306A outputs score 314A, which is indicative of a likelihood that a visual anomaly exists within image 118A. Detection model 306B outputs score 314B, which is indicative of a likelihood that a visual anomaly exists within image 118B. Detection model 306N outputs score 314N, which is indicative of a likelihood that a visual anomaly exists within image 118N. Scores 314A-314N are provided to monitor 312.

At step 408, for each image, responsive to determining that a visual anomaly exists within the image, at least one action is performed. The action includes generating an alert about the visual anomaly or performing an automated action to correct a problem that caused the detected visual anomaly. For example, with reference to FIG. 3, responsive to monitor 312 determining that a visual anomaly exists within any of images 118A-118N, monitor 312 performs an action. For instance, monitor 312 may generate alert 314 about the visual anomaly or performs an automated action to correct a problem that caused the detected visual anomaly.

In accordance with one or more embodiments, the automated action comprises at least one of causing a computing device of the plurality of computing devices that provided the image to be restarted or causing an application window, displayed via the computing device that provided the image, to be minimized. For example, with reference to FIGS. 1 and 3, monitor 312 may issue command 320 to the computing device that provides the image comprising the visual anomaly to be restarted. For instance, if image 118A is determined to comprise a visual anomaly, monitor 312 may issue command 320 to computing device 102A (which generated image 318A) that causes computing device 102A to be restarted. In another example, suppose the visual anomaly is caused by an application window being displayed over the content intended to be displayed via multi-display system 108. In such an example, monitor 312 may issue command 320 to the computing device that provides the image comprising the visual anomaly, which causes the computing device to minimize the problematic application window.

In accordance with one or more embodiments, the alert specifies the computing device identifier associated with the image. For example, with reference to FIG. 3, alert 124 may comprise the computing device identifier associated with the image comprising the visual anomaly.

Figure 5:
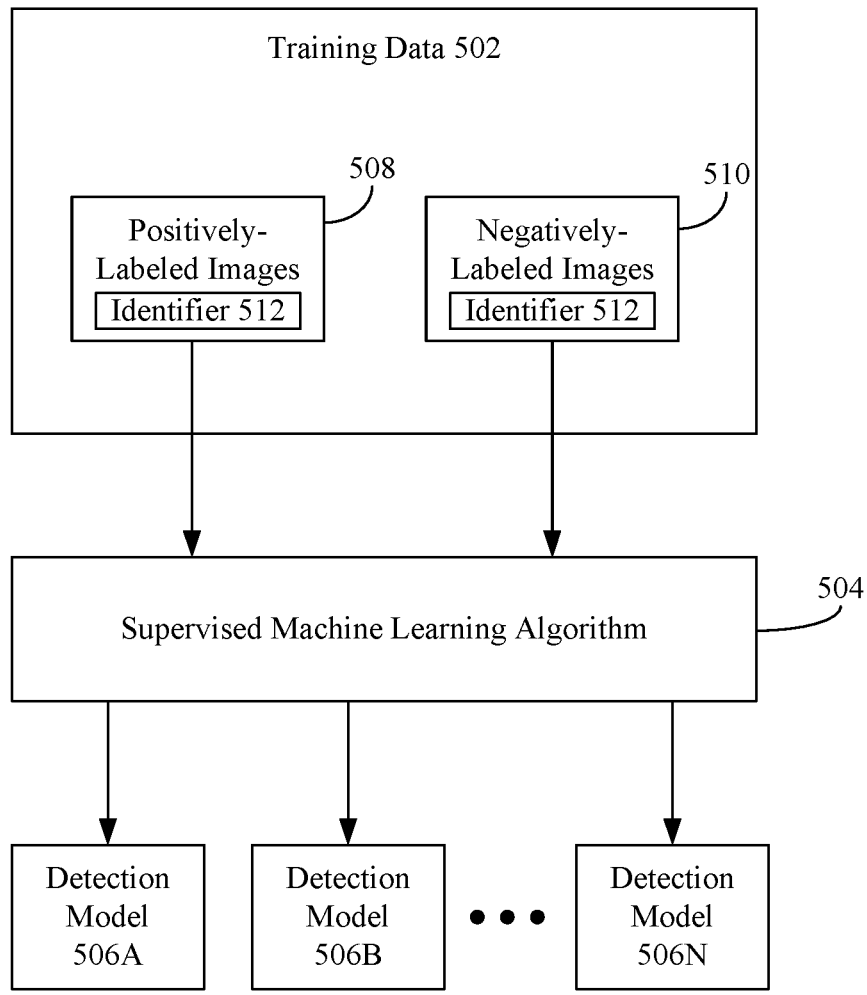
FIG. 5 depicts a block diagram of a system for generating visual anomaly detection models in accordance with an example embodiment.

FIG. 5 depicts a block diagram of a system 500 for generating visual anomaly detection models in accordance with an example embodiment. As shown in FIG. 5, system 500 comprises training data 502, a supervised machine learning algorithm 504, and visual anomaly detection models 506A-506N. Visual anomaly detection models 506A-506N are examples of visual anomaly detection models 306A-306N, as described above with reference to FIG. 3. Training data 502, supervised machine learning algorithm 504, and/or visual anomaly detection models 506A-506N may be incorporated as part of anomaly detector 310, as described above with reference to FIG. 3, although the embodiments described herein are not so limited.

Training data 502 represents images (e.g., images 118A-118N, as described above with reference to FIGS. 1 and 3) that were previously generated (e.g., by agents 116A-116N, as described above with reference to FIG. 1) over the course of a past predetermined time period, such as, but not limited to, one or more days, weeks, months, or years. Training data 502 may be stored in a storage repository (e.g., storage system 302, as described above with reference to FIG. 3).

Training data 502 may comprise hundreds, thousands, or hundreds of thousands of such images. Each of the images in training data 704 may be labeled to indicate whether or not a visual anomaly exists therein. For instance, images that have known visual anomalies may be labeled as positively-labeled images 508, and images that have no visual anomalies may be labeled as negatively-labeled images 510. Each of the images of positively-labeled images 508 and negatively-labeled images 510 are associated with a computing device identifier 512, which identifies the computing device (e.g., one of computing device(s) 102A-102N (as shown in FIG. 1)) that generated the image.

Positively-labeled images 508 and their associated computing device identifier 512 are provided as a first input to supervised machine learning algorithm 504, and negatively-labeled images 510 and their associated computing device identifier 512 are provided as a second input to supervised machine learning algorithm 504. Supervised machine learning algorithm 504 may group positively-labeled images 508 and positively-labeled image 510 having the same identifier 512, analyzes such images on a group-by-group basis, and learns what constitutes an image that comprises a visual anomaly for the computing device associated with that identifier. Supervised machine learning algorithm 504 generates a visual anomaly detection model for that identifier that is utilized to generate a score indicative of the likelihood that any given image provided by the computing device associated with that identifier comprises a visual anomaly.

For instance, supervised machine learning algorithm 504 groups positively-labeled images 508 and negatively-labeled images 510 associated with a computing device identifier that identifies computing device 102A (as shown in FIG. 1), analyzes such images, and learns what constitutes an image that comprises a visual anomaly for images generated by computing device 102A. Supervised machine learning algorithm 504 generates visual anomaly detection model 502A that is utilized to generate a score indicative of the likelihood that any given image provided by computing device 102A associated comprises a visual anomaly. In another example, supervised machine learning algorithm 504 groups positively-labeled images 508 and negatively-labeled images 510 associated with a computing device identifier that identifies computing device 102B (as shown in FIG. 1), analyzes such images, and learns what constitutes an image that comprises a visual anomaly for images generated by computing device 102B. Supervised machine learning algorithm 504 generates visual anomaly detection model 502B that is utilized to generate a score indicative of the likelihood that any given image provided by computing device 102B associated comprises a visual anomaly. In yet another example, supervised machine learning algorithm 504 groups positively-labeled images 508 and negatively-labeled images 510 associated with a computing device identifier that identifies computing device 102N (as shown in FIG. 1), analyzes such images, and learns what constitutes an image that comprises a visual anomaly for images generated by computing device 102N. Supervised machine learning algorithm 504 generates visual anomaly detection model 502N that is utilized to generate a score indicative of the likelihood that any given image provided by computing device 102N associated comprises a visual anomaly.

Visual anomaly detection models 506A-506N may be artificial neural network-based models, convolution neural network-based models, K-nearest neighbor-based models, decision tree-models, support vector machine-based models, etc.

Accordingly, a visual anomaly detection model may be utilized for identifying visual anomalies in images in many ways. For example, FIG. 6 shows a flowchart 600 of a method for generating a visual anomaly detection model for identifying visual anomalies in images in accordance with example embodiment. In an embodiment, flowchart 600 may be implemented by system 500, as described in FIG. 5. Accordingly, flowchart 600 will be described with continued reference FIG. 5. Other structural and operational embodiments will be apparent to persons skilled in the relevant art(s) based on the following discussion regarding flowchart 600 and system 500.

Figure 6:
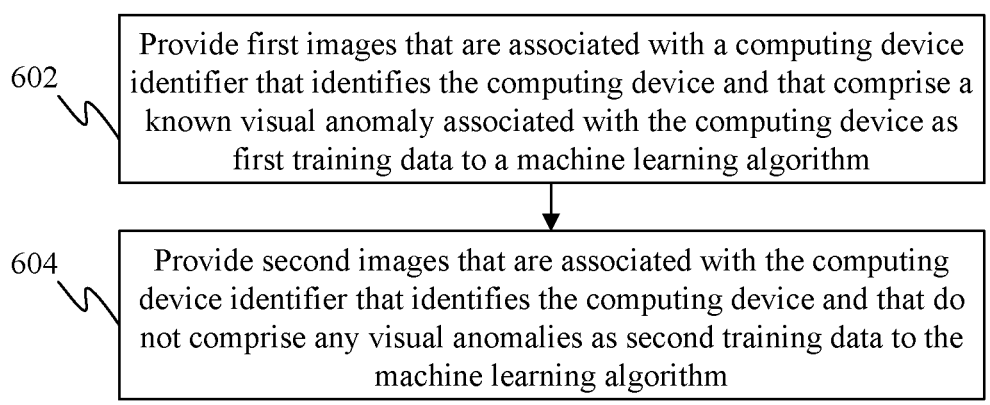
FIG. 6 shows a flowchart of a method for generating a visual anomaly detection model for identifying visual anomalies in images in accordance with example embodiment.

As shown in FIG. 6, the method of flowchart 600 begins at step 602. At step 602, first images that are associated with a computing device identifier that identifies the computing device and that comprise a known visual anomaly associated with the computing device are provided as first training data to a machine learning algorithm. For example, with reference to FIG. 5, first images associated with a computing device identifier (e.g., identifier 512) that identifies a computing device (e.g., computing device 102A) that generated the first images and that comprise a known visual anomaly are provided as first training data (e.g., negatively-labeled images 510) to supervised machine learning algorithm 504.

At step 604, second images that are associated with the computing device identifier that identifies the computing device and that do not comprise any visual anomalies are provided as second training data to a machine learning algorithm, the machine learning algorithm being configured to generate a visual anomaly detection model of the plurality of visual anomaly detection models that is associated with the computing device based on the first training data and the second training data. For example, with reference to FIG. 5, second images associated with the computing device identifier (e.g., identifier 512) that identifies the computing device (e.g., computing device 102A) that generated the second images and that do not comprise a visual anomaly are provided as second training data (e.g., positively-labeled images 508) to supervised machine learning algorithm 504. Supervised machine learning algorithm 504 generates visual anomaly detection model 506A that is associated with computing device 506A based on positively-labeled images 508 and negatively-labeled images 510 having an identifier 512 that identifies computing device 506A. Supervised machine learning algorithm 504 generates visual anomaly detection model 506B that is associated with computing device 506B based on positively-labeled images 508 and negatively-labeled images 510 having an identifier 512 that identifies computing device 506B. Supervised machine learning algorithm 504 generates visual anomaly detection model 506N that is associated with computing device 506N based on positively-labeled images 508 and negatively-labeled images 510 having an identifier 512 that identifies computing device 506N.

III. Example Mobile and Stationary Device Embodiments

The systems and methods described above in reference to FIGS. 1-6, may be implemented in hardware, or hardware combined with one or both of software and/or firmware. For example, system 100, computing device(s) 102A-102N, multi-display system 108, cloud services platform 122, admin computing device 112, application windows 114A-114N, agents 116A-116N, classification models 106, multi-display system 200, cloud services platform 300, storage system 302, anomaly detector 310, image retriever 304, model selector 308, visual anomaly detection models 306A-306N, monitor 312, portal 326, supervised machine learning algorithm 504, visual anomaly detection models 506A-506N, and/or each of the components described therein, and flowcharts 400 and/or 600 may be each implemented as computer program code/instructions configured to be executed in one or more processors and stored in a computer readable storage medium. Alternatively, system 100, computing device(s) 102A-102N, multi-display system 108, cloud services platform 122, admin computing device 112, application windows 114A-114N, agents 116A-116N, classification models 106, multi-display system 200, cloud services platform 300, storage system 302, anomaly detector 310, image retriever 304, model selector 308, visual anomaly detection models 306A-306N, monitor 312, portal 326, supervised machine learning algorithm 504, visual anomaly detection models 506A-506N, and/or each of the components described therein, and flowcharts 400 and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
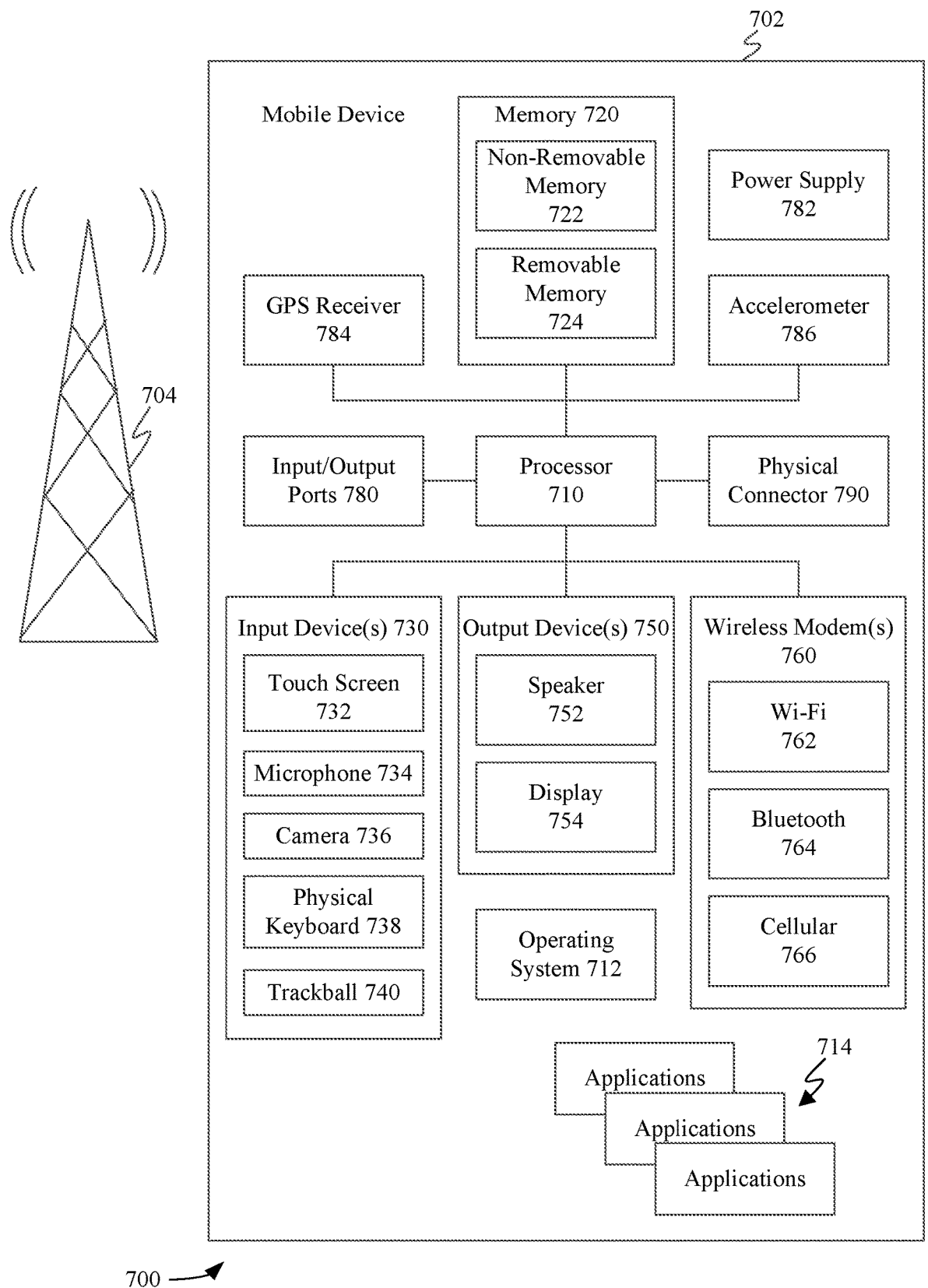
FIG. 7 is a block diagram of an exemplary user device in which embodiments may be implemented.

FIG. 7 shows a block diagram of an exemplary mobile device 700 including a variety of optional hardware and software components, shown generally as components 702. Any number and combination of the features/elements of system 100, computing device(s) 102A-102N, multi-display system 108, cloud services platform 122, admin computing device 112, application windows 114A-114N, agents 116A-116N, classification models 106, multi-display system 200, cloud services platform 300, storage system 302, anomaly detector 310, image retriever 304, model selector 308, visual anomaly detection models 306A-306N, portal 326, monitor 312, supervised machine learning algorithm 504, visual anomaly detection models 506A-506N, and/or each of the components described therein, and flowcharts 400 and/or 600 may be implemented as components 702 included in a mobile device embodiment, as well as additional and/or alternative features/elements, as would be known to persons skilled in the relevant art(s). It is noted that any of components 702 can communicate with any other of components 702, although not all connections are shown, for ease of illustration. Mobile device 700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 704, such as a cellular or satellite network, or with a local area or wide area network.

The illustrated mobile device 700 can include a controller or processor referred to as processor circuit 710 for performing such tasks as signal coding, image processing, data processing, input/output processing, power control, and/or other functions. Processor circuit 710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 710 may execute program code stored in a computer readable medium, such as program code of one or more applications 714, operating system 712, any program code stored in memory 720, etc. Operating system 712 can control the allocation and usage of the components 702 and support for one or more application programs 714 (a.k.a. applications, "apps", etc.). Application programs 714 can include common mobile computing applications (e.g., email applications, calendars, contact managers, web browsers, messaging applications) and any other computing applications (e.g., word processing applications, mapping applications, media player applications).

As illustrated, mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running operating system 712 and applications 714. Example data can include web pages, text, images, sound files, video data, or other data sets to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing the systems described above, including the embodiments described in reference to FIGS. 1-6.

Mobile device 700 can support one or more input devices 730, such as a touch screen 732, microphone 734, camera 736, physical keyboard 738 and/or trackball 740 and one or more output devices 750, such as a speaker 752 and a display 754.

Other possible output devices (not shown) can include piezoelectric or other haptic output devices. Some devices can serve more than one input/output function. For example, touch screen 732 and display 754 can be combined in a single input/output device. The input devices 730 can include a Natural User Interface (NUI).

Wireless modem(s) 760 can be coupled to antenna(s) (not shown) and can support two-way communications between processor circuit 710 and external devices, as is well understood in the art. The modem(s) 760 are shown generically and can include a cellular modem 766 for communicating with the mobile communication network 704 and/or other radio-based modems (e.g., Bluetooth 764 and/or Wi-Fi 762). Cellular modem 766 may be configured to enable phone calls (and optionally transmit data) according to any suitable communication standard or technology, such as GSM, 3G, 4G, 5G, etc. At least one of the wireless modem(s) 760 is typically configured for communication with one or more cellular networks, such as a GSM network for data and voice communications within a single cellular network, between cellular networks, or between the mobile device and a public switched telephone network (PSTN).

Mobile device 700 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be not present and other components can be additionally present as would be recognized by one skilled in the art.

Figure 8:
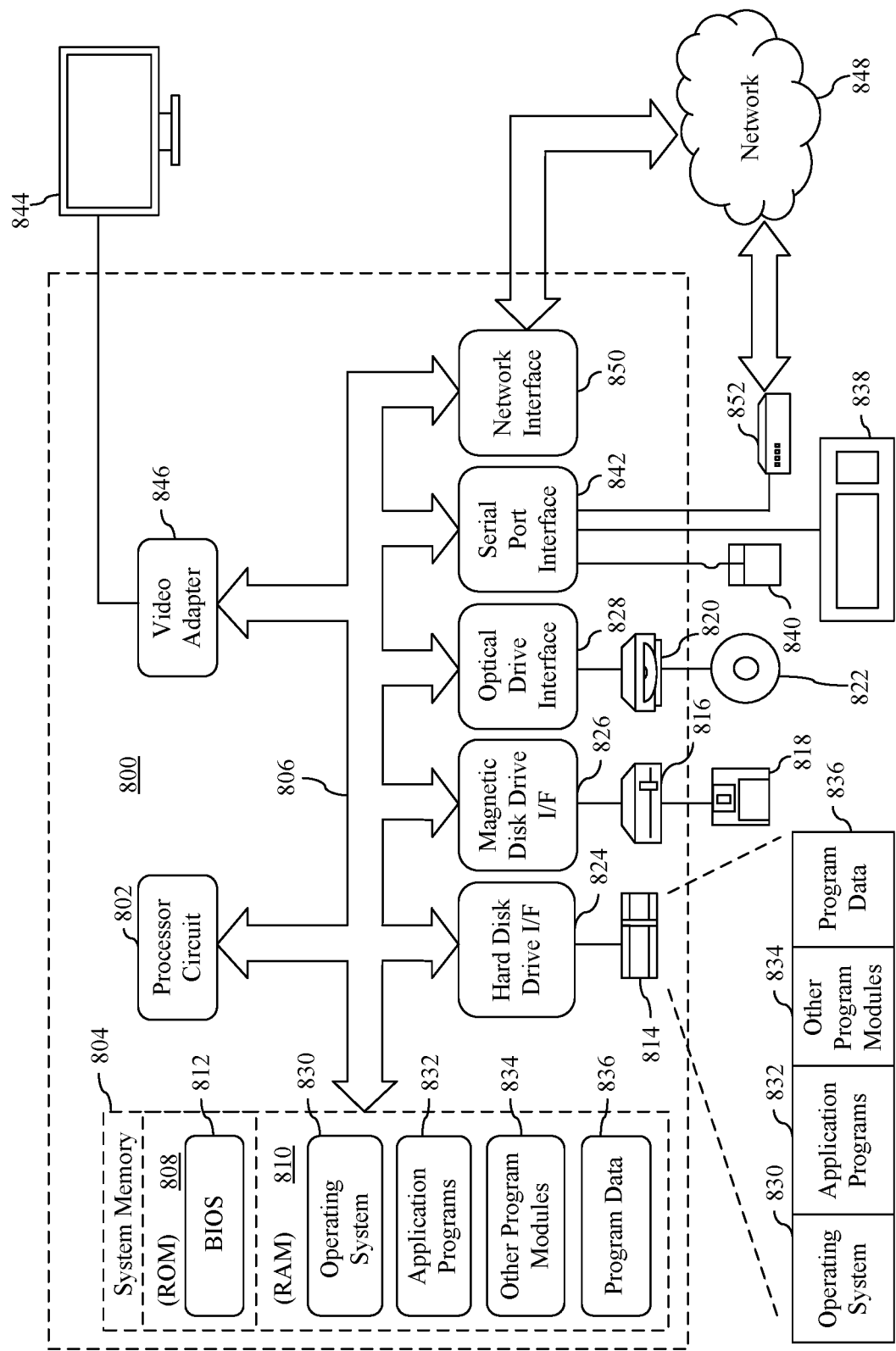
FIG. 8 is a block diagram of an example processor-based computer system that may be used to implement various embodiments.

Furthermore, FIG. 8 depicts an exemplary implementation of a computing device 1000 in which embodiments may be implemented, including system 100, computing device(s) 102A-102N, multi-display system 108, cloud services platform 122, admin computing device 112, application windows 114A-114N, agents 116A-116N, classification models 106, multi-display system 200, cloud services platform 300, storage system 302, anomaly detector 310, image retriever 304, model selector 308, visual anomaly detection models 306A-306N, monitor 312, portal 326, supervised machine learning algorithm 504, visual anomaly detection models 506A-506N, and/or each of the components described therein, and flowcharts 400 and/or 600. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the embodiments described above with reference to FIGS. 1-15.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein. The method comprises: periodically obtaining from a storage system a plurality of images respectively generated by a plurality of computing devices and a computing device identifier associated with each of the plurality of images, each of the plurality of computing devices being configured to periodically transmit to the storage system images generated thereby and the computing device identifier associated therewith for storage by the storage system; for each image obtained from the storage system: selecting, based on the computing device identifier associated with the image, a visual anomaly detection model from among a plurality of visual anomaly detection models that respectively correspond to the plurality of computing devices; applying the selected visual anomaly detection model to the image to determine whether a visual anomaly exists within the image; and responsive to determining that a visual anomaly exists within the image, performing at least one of: generating an alert about the visual anomaly; or performing an automated action to correct a problem that caused the detected visual anomaly In one embodiment of the foregoing method, a frequency at which each of the computing devices is configured to periodically transmit the images generated thereby is related to a frequency at which the plurality of images are periodically obtained from the storage system.

In one embodiment of the foregoing method, the frequency at which each of the computing devices is configured to periodically transmit the images generated thereby and the frequency at which the plurality of images are periodically obtained from the storage system are user-configurable.

In one embodiment of the foregoing method, the plurality of images corresponds to content provided to a multi-display system by the plurality of computing devices.

In one embodiment of the foregoing method, the computing device identifier associated with a particular image of the plurality of images identifies a particular computing device of the plurality of computing devices that generated the particular image.

In one embodiment of the foregoing method, the plurality of visual anomaly detection models is generated by, for each computing device in the plurality of computing devices: providing first images that are associated with a computing device identifier that identifies the computing device and that comprise a known visual anomaly associated with the computing device as first training data to a machine learning algorithm; and providing second images that are associated with the computing device identifier that identifies the computing device and that do not comprise any visual anomalies as second training data to the machine learning algorithm, wherein the machine learning algorithm is configured to generate a visual anomaly detection model of the plurality of visual anomaly detection models that is associated with the computing device based on the first training data and the second training data.

In one embodiment of the foregoing method, performing the automated action to correct the problem that caused the detected visual anomaly comprises at least one of: causing a computing device of the plurality of computing devices that provided the image to be restarted; or causing an application window, displayed via the computing device that provided the image, to be minimized.

In one embodiment of the foregoing method, the alert specifies the computing device identifier associated with the image.

A system is also described herein. The system includes at least one processor circuit; and at least one memory that stores program code configured to be executed by the at least one processor circuit, the program code comprising: an image retriever configured to: periodically obtain from a storage system a plurality of images respectively generated by a plurality of computing devices and a computing device identifier associated with each of the plurality of images, each of the plurality of computing devices being configured to periodically transmit to the storage system images generated thereby and the computing device identifier associated therewith for storage by the storage system; a model selector configured to: for each image obtained from the storage system: select, based on the computing device identifier associated with the image, a visual anomaly detection model from among a plurality of visual anomaly detection models that respectively correspond to the plurality of computing devices; and apply the selected visual anomaly detection model to the image to determine whether a visual anomaly exists within the image; and a monitor configured to: responsive to a determination that a visual anomaly exists within the image, perform at least one of: generating an alert about the visual anomaly; or performing an automated action to correct a problem that caused the detected visual anomaly.

In one embodiment of the foregoing system, a frequency at which each of the computing devices is configured to periodically transmit the images generated thereby is related to a frequency at which the plurality of images are periodically obtained from the storage system.

In one embodiment of the foregoing system, the frequency at which each of the computing devices is configured to periodically transmit the images generated thereby and the frequency at which the plurality of images are periodically obtained from the storage system are user-configurable.

In one embodiment of the foregoing system, the plurality of images corresponds to content provided to a multi-display system by the plurality of computing devices.

In one embodiment of the foregoing system, the computing device identifier associated with a particular image of the plurality of images identifies a particular computing device of the plurality of computing devices that generated the particular image.

In one embodiment of the foregoing system, the plurality of visual anomaly detection models is generated by, for each computing device in the plurality of computing devices: providing first images that are associated with a computing device identifier that identifies the computing device and that comprise a known visual anomaly associated with the computing device as first training data to a machine learning algorithm; and providing second images that are associated with the computing device identifier that identifies the computing device and that do not comprise any visual anomalies as second training data to the machine learning algorithm, wherein the machine learning algorithm is configured to generate a visual anomaly detection model of the plurality of visual anomaly detection models that is associated with the computing device based on the first training data and the second training data.

In one embodiment of the foregoing system, the automated action performed by the monitor comprises at least one of: causing a computing device of the plurality of computing devices that provided the image to be restarted;

or causing an application window, displayed via the computing device that provided the image, to be minimized.

In one embodiment of the foregoing system, the alert specifies the computing device identifier associated with the image.

In one embodiment of the foregoing system, the storage system, the image retriever, the model selector, and the monitor are implemented in a cloud-based environment communicatively coupled to the plurality of computing devices, and wherein the image retriever is an event-triggered cloud-based compute service.

A computer-readable storage medium having program instructions recorded thereon that, when executed by at least one processor of a computing device, perform a method. The method includes: periodically obtaining from a storage system a plurality of images respectively generated by a plurality of computing devices and a computing device identifier associated with each of the plurality of images, each of the plurality of computing devices being configured to periodically transmit to the storage system images generated thereby and the computing device identifier associated therewith for storage by the storage system; for each image obtained from the storage system: selecting, based on the computing device identifier associated with the image, a visual anomaly detection model from among a plurality of visual anomaly detection models that respectively correspond to the plurality of computing devices; applying the selected visual anomaly detection model to the image to determine whether a visual anomaly exists within the image; and responsive to determining that a visual anomaly exists within the image, performing at least one of: generating an alert about the visual anomaly; or performing an automated action to correct a problem that caused the detected visual anomaly.

In one embodiment of the foregoing computer-readable storage medium, a frequency at which each of the computing devices is configured to periodically transmit the images generated thereby is related to a frequency at which the plurality of images are periodically obtained from the storage system.

In one embodiment of the foregoing computer-readable storage medium, the frequency at which each of the computing devices is configured to periodically transmit the images generated thereby and the frequency at which the plurality of images are periodically obtained from the storage system are user-configurable.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
   obtaining a plurality of images from a plurality of respective computing devices, an image of the plurality of images being associated with an identifier for a respective computing device from which the image is obtained;
   selecting, based on the identifier associated with the image, a visual anomaly detection model from among a plurality of visual anomaly detection models that respectively correspond to the plurality of computing devices;
   determining that a visual anomaly exists within the image by applying the visual anomaly detection model to the image; and
   responsive to determining that the visual anomaly exists within the image, performing at least one of:
   generating an alert for the visual anomaly; or
   performing an automated action to correct a problem that caused the visual anomaly.

2. The method of claim 1, wherein a first frequency at which the plurality of respective computing devices is configured to generate the plurality of images is related to a second frequency at which the plurality of images are obtained from the plurality of respective computing devices.

3. The method of claim 2, wherein the first frequency and the second frequency are user-configurable.

4. The method of claim 1, wherein the plurality of images corresponds to content provided to a multi-display system by the plurality of respective computing devices.

5. The method of claim 1, wherein the plurality of visual anomaly detection models is generated by, for each respective computing device in the plurality of respective computing devices:
   providing first images that are associated with the identifier for the respective computing device and that comprise a known visual anomaly associated with the respective computing device as first training data to a machine learning algorithm; and
   providing second images that are associated with the identifier for the respective computing device and that do not comprise any visual anomalies as second training data to the machine learning algorithm, wherein the machine learning algorithm is configured to generate a respective visual anomaly detection model of the plurality of visual anomaly detection models that is associated with the respective computing device based on the first training data and the second training data.

6. The method of claim 1, wherein performing the automated action to correct the problem that caused the visual anomaly comprises at least one of:
   causing the respective computing device that provided the image to be restarted; or
   causing an application window, displayed via the respective computing device that provided the image, to be minimized.

7. The method of claim 1, wherein the alert specifies the identifier associated with the image.

8. A system, comprising:
   at least one processor circuit; and
   at least one memory that stores program code that, when executed by the at least one processor circuit, cause the system to perform operations comprising:
   obtain a plurality of images from a plurality of respective computing devices, an image of the plurality of images computing devices being associated with an identifier for a respective computing device from which the image is obtained;
   select, based on the identifier associated with the image, a visual anomaly detection model from among a plurality of visual anomaly detection models that respectively correspond to the plurality of computing devices; and determine that a visual anomaly exists within the image by applying the visual anomaly detection model to the image; and responsive to a determination that the visual anomaly exists within the image, perform at least one of:
generating an alert for the visual anomaly; or
performing an automated action to correct a problem that caused the visual anomaly.

9. The system of claim 8, wherein a first frequency at which the plurality of respective computing devices is configured to generate the plurality of images is related to a second frequency at which the plurality of images are obtained from the plurality of respective computing devices.

10. The system of claim 9, wherein the first frequency and the second frequency are user-configurable.

11. The system of claim 8, wherein the plurality of images corresponds to content provided to a multi-display system by the plurality of respective computing devices.

12. The system of claim 8, wherein the plurality of visual anomaly detection models is generated by, for each respective computing device in the plurality of respective computing devices:

providing first images that are associated with the identifier for the respective computing device and that comprise a known visual anomaly associated with the respective computing device as first training data to a machine learning algorithm; and providing second images that are associated with the identifier for the respective computing device and that do not comprise any visual anomalies as second training data to the machine learning algorithm, wherein the machine learning algorithm is configured to generate a respective visual anomaly detection model of the plurality of visual anomaly detection models that is associated with the respective computing device based on the first training data and the second training data.

13. The system of claim 8, wherein the automated action performed by the monitor comprises at least one of:

causing the respective computing device that provided the image to be restarted; or causing an application window, displayed via the respective computing device that provided the image, to be minimized.

14. The system of claim 8, wherein the alert specifies the identifier associated with the image.

15. The system of claim 8, wherein the operations are implemented in a cloud-based environment communicatively coupled to the plurality of respective computing devices via an event-triggered cloud-based compute service.

16. A computer-readable storage medium having program instructions recorded thereon that, when executed by at least one processor of a computing device, perform operations comprising:

obtaining a plurality of images from a plurality of respective computing devices, an image of the plurality of images being associated with an identifier for a respective computing device from which the image is obtained;

selecting, based on the identifier associated with the image, a visual anomaly detection model from among a plurality of visual anomaly detection models that respectively correspond to the plurality of computing devices;

determining that a visual anomaly exists within the image by applying the visual anomaly detection model to the image, and responsive to determining that the visual anomaly exists within the image, performing at least one of:

generating an alert for the visual anomaly; or
performing an automated action to correct a problem that caused the visual anomaly.

17. The computer-readable storage medium of claim 16, wherein a first frequency at which the plurality of respective computing devices generate the plurality of images is related to a second frequency at which the plurality of images are obtained from the plurality of respective computing devices.

18. The computer-readable storage medium of claim 17, wherein the first frequency and the second frequency are user-configurable.

* * * * *